United States Patent
Kayama et al.

(10) Patent No.: US 7,117,003 B2
(45) Date of Patent: Oct. 3, 2006

(54) COMMUNICATIONS CONTROL SYSTEM, COMMUNICATIONS CONTROL METHOD, AND MOBILE STATION AND BASE STATION FOR USE THEREIN

(75) Inventors: Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 776 days.

(21) Appl. No.: 10/300,814

(22) Filed: Nov. 21, 2002

(65) Prior Publication Data
US 2003/0096631 A1    May 22, 2003

(30) Foreign Application Priority Data
Nov. 22, 2001  (JP)  .............................. 2001-358307

(51) Int. Cl.
*H04B 7/00*    (2006.01)
*H04Q 7/20*    (2006.01)

(52) U.S. Cl. ................... 455/522; 455/515; 455/67.13; 455/63.1; 455/501; 455/450; 455/452.1; 370/322; 370/335; 370/437; 370/450; 370/455

(58) Field of Classification Search ................ 455/515, 455/67.13, 63.1, 501, 522, 450, 452.1; 370/335, 370/322, 403, 347, 443, 437, 450, 455
See application file for complete search history.

(56) References Cited

U.S. PATENT DOCUMENTS

| | | | |
|---|---|---|---|
| 5,787,080 A | * | 7/1998 | Hulyalkar et al. ....... 370/310.2 |
| 5,815,492 A | * | 9/1998 | Berthaud et al. ........... 370/234 |
| 5,828,662 A | * | 10/1998 | Jalali et al. .................. 370/335 |
| 5,940,372 A | * | 8/1999 | Bertin et al. ................. 370/238 |
| 6,078,572 A | * | 6/2000 | Tanno et al. ................. 370/335 |
| 6,084,869 A | * | 7/2000 | Fishman et al. ............. 370/348 |
| 6,091,717 A | * | 7/2000 | Honkasalo et al. ......... 370/329 |
| 6,094,576 A | * | 7/2000 | Hakkinen et al. ......... 455/422.1 |
| 6,400,695 B1 | * | 6/2002 | Chuah et al. ................ 370/310 |

FOREIGN PATENT DOCUMENTS

| | | | |
|---|---|---|---|
| GB | 2346779 | * | 6/1999 |
| GB | 2 346 779 A | | 8/2000 |
| WO | WO 00/25443 | | 5/2000 |
| WO | WO 01/37481 A2 | | 5/2001 |

* cited by examiner

*Primary Examiner*—Marceau Milord
(74) *Attorney, Agent, or Firm*—Oblon, Spivak, McClelland, Maier & Neustadt, P.C.

(57) ABSTRACT

The present invention allows transmission power control for each packet without increasing overhead and control processing delay in communications control systems such as CDMA systems, thereby increasing the quality of transmission. The present invention provides a communications control system for controlling packet communications between a base station and a mobile station, including a determiner for determining the transmission power level of packet data based on the received intensity of a preamble signal transmitted in advance of transmission of the packet data or a reservation signal, a reservation signal transmitter for transmitting to the base station information regarding the amount and type of subsequent packet data as the reservation signal in parallel with transmission processing of the packet data, and a packet data transmitter for obtaining information regarding the determined transmission power level at the mobile station and transmitting the packet data based on the obtained information.

34 Claims, 9 Drawing Sheets

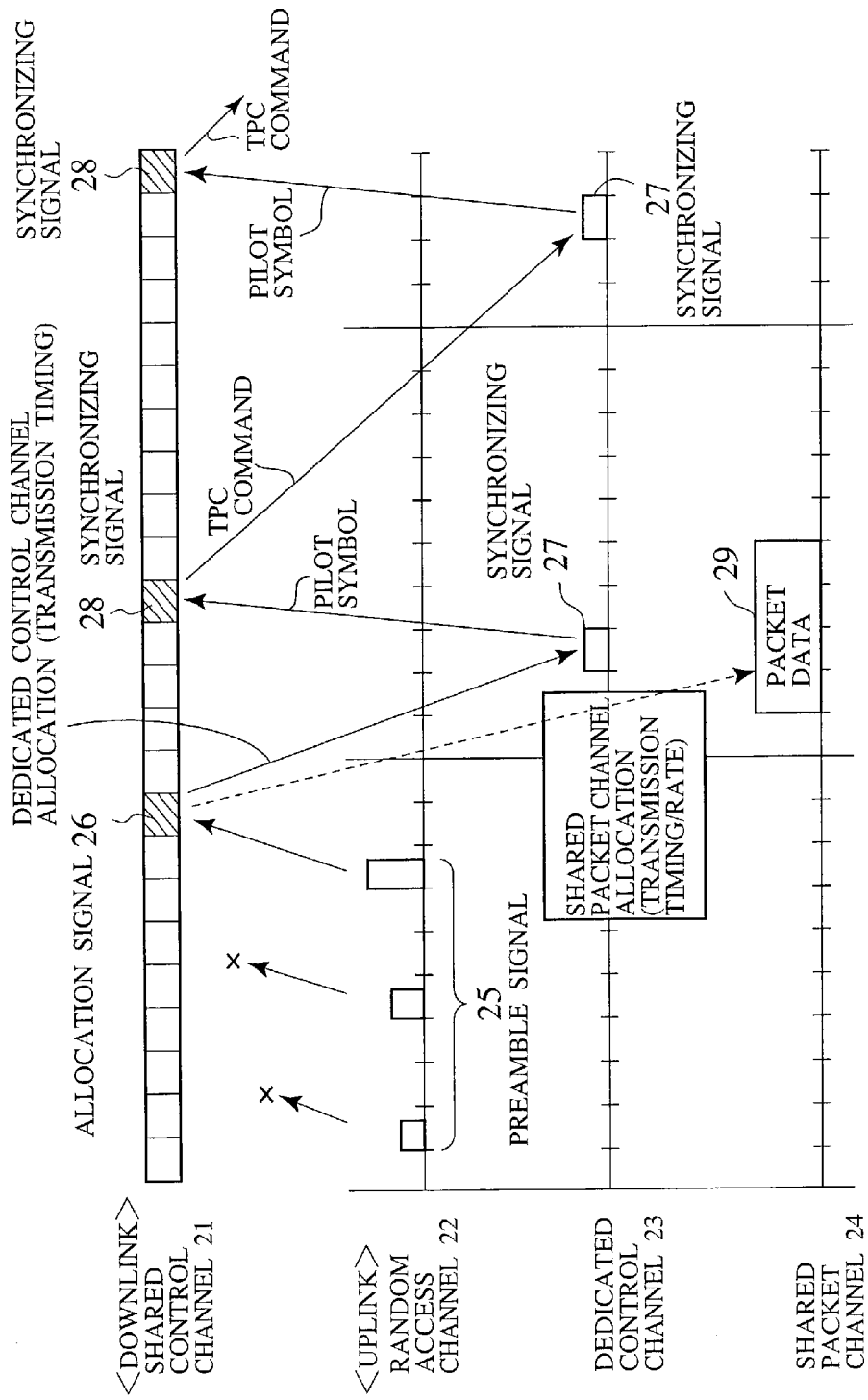

COMMUNICATIONS CONTROL SYSTEM, COMMUNICATIONS CONTROL METHOD, AND MOBILE STATION AND BASE STATION FOR USE THEREIN

CROSS REFERENCE TO RELATED APPLICATION

This application is based upon and claims the benefit of priority from the prior Japanese Patent Application No. P2001-358307, filed on Nov. 22, 2001; the entire contents of which are incorporated herein by reference.

BACKGROUND OF THE INVENTION

1. Field of the Invention

The present invention relates to a communications control system, a communications control method, and a mobile station and a base station for use therein, for controlling packet communications between the base station and the mobile station such as CDMA packet communications.

2. Description of the Related Art

A W-CDMA system, a third-generation mobile communications control system, adopts a method of adaptively switching between a shared channel and a dedicated channel in accordance with traffic.

On a RACH (random access channel), a type of shared channel, a packet is separated into a preamble signal (preamble portion) and packet data (data portion) for transmission. A mobile station transmits, before transmitting the packet data, the preamble signal several times, gradually increasing in predetermined steps the transmission power from a small transmission power level until receiving an acquisition indicator AI from a base station.

Upon detecting the preamble signal, the base station transmits an acquisition indicator AI to the mobile station on the RACH. When receiving the acquisition indicator AI, the mobile station starts transmitting the packet data at a transmission power level determined based on the transmission power level of the preamble signal having been transmitted immediately before. This method is called "power ramping" which allows transmission power control for each packet.

When the amount of packets stored in a transmission buffer becomes equal to or more than a predetermined threshold, a DCH (dedicated control channel) is established between the mobile station and the base station as in circuit switching communications, and resources for packet communications between the mobile station and the base station are exclusively allocated.

With this, a control channel associated with the dedicated control channel DCH performs packet data transmission power control on a regular basis, eliminating the need for power ramping.

On the other hand, a "reservation method" is known as a technique for efficiently using an RACH. In the reservation method, a mobile station transmits a very short reservation signal to a base station before transmitting a packet, and the base station controls the packet transmission by the mobile station to avoid packet data collision, in view of its resource allocation conditions.

For the reservation method, various systems such as Reservation ALOHA, SRMA (split-channel reservation multiple access), PRMA (packet reservation multiple access), DQRUMA (distributed queuing request update multiple access) have been proposed for practical use.

For the reservation method, a method of transmitting a reservation signal on an RACH such as a Slotted ALOHA system, a method of transmitting a reservation signal in minislots which are fixedly allocated to each mobile station (e.g., CSMA: global scheduling multiple access), and a method of selectively using the above two methods in accordance with the type of traffic (PODA: priority-oriented demand assignment) are known.

The use of the reservation method for a base station to control packet transmission by mobile stations enables solving a so-called "hidden terminal problem" such as signal collision between mobile terminals each out of the other's view.

Further, specification of the priority or the like of packets in reservation signals allows a base station to schedule transmission of packets in accordance with the priority and also to deal with QoS control in uplink packet transmission.

CDMA communications have a near-far problem and require packet transmission power control to obtain sufficient channel efficiency in cellular environments.

Fading, shadowing, interference, moving of mobile stations and the like dynamically vary transmission characteristics in a radio link between mobile stations and a base station. Packet communications in which a burst of traffic is produced thus require transmission power control on a packet basis such as the above-described power ramping.

A conventional communications control method using power ramping, however, has a problem that it requires adjustment of transmission power using a preamble signal for each packet, resulting in increased overhead.

The communications control method further has a problem that fixing the packet data transmission power at the start of transmission of packet data prevents continuous transmission of packets containing lengthy packet data.

The communications control method still further has a problem that it is difficult for it to conduct QoS control according to packet types.

On the other hand, a communications control method utilizing the above-described reservation method has a problem that it does not give consideration to packet data transmission power control.

The communications control method further has a problem that higher the packet transmission speed, larger the decrease in efficiency due to delay in response from a base station to a reservation signal.

The communications control method still further has a problem that when reservation signals are transmitted over a RACH, packet collisions can cause delay in reception of the reservation signals, causing quality degradation especially in real-time communications such as voice communications which allow short delay time.

BRIEF SUMMARY OF THE INVENTION

It is thus an object of the present invention to provide a communications control system, a communications control method, and a mobile station and a base station suitable for use therein, which allow transmission power control for each packet without increasing overhead and control processing delay and allow improvement in quality of communications.

According to a first aspect of the present invention, there is provided a communications control system for controlling packet communications between a base station and a mobile station, which system comprises: a preamble signal transmitter configured to transmit a preamble signal to the base station, varying the transmission power level, in advance of transmission of packet data or a reservation signal; a reservation signal transmitter configured to transmit information, as the reservation signal, regarding the amount and type of subsequent packet data to the base station, in parallel with transmission processing of the packet data; a determiner configured to determine the transmission power level of the packet data based on the received intensity of the preamble signal or the reservation signal and the information regarding the amount and type of the packet data; and a packet data transmitter configured to obtain information regarding the determined transmission power level of the packet data and transmit the packet data based on the obtained information.

The determiner preferably determines the transmission power level of a first reservation signal based on the received intensity of the preamble signal, and determines the transmission power level of a subsequent reservation signal based on the received intensity of a preceding reservation signal; and the reservation signal transmitter preferably obtains information regarding the determined transmission power level of the reservation signal and transmits the reservation signal at the transmission power level based on the obtained information.

The reservation signal transmitter preferably periodically or continuously transmits the reservation signal from the mobile station to the base station over a control channel established in addition to a channel on which to transmit the packet data.

The control channel is preferably exclusively allocated temporary in a radio link between the mobile station and the base station by use of a distinct code, a specific timing or both so as not to interfere with other control channels.

The allocation of the control channel is preferably released when there is no packet data to be transmitted and received between the mobile station and the base station within a predetermined period; and the predetermined period is preferably determined based on the type of the packet data, the traffic conditions of the packet data or both.

The communications control system preferably further comprises: a grant signal transmitter configured to transmit a grant signal instructing the method of transmission of the packet data to the mobile station, in response to the reservation signal received; the grant signal including a transmission timing and a transmission rate for time-division and code-division multiplexing of the packet data.

When packet data to be transmitted is a single packet of data, the preamble signal preferably includes information notifying the fact; and the determiner preferably varies the method of transmission of the packet data or the reservation signal based on the notification.

The communications control system preferably further comprises: an interference power detector configured to detect interference power at the base station; and an interference preventer configured to inhibit transmission of the preamble signal when the interference power detected exceeds a predetermined threshold.

The reservation signal transmitter preferably stops transmitting the reservation signal when a channel on which to transmit the packet data and a control channel are saturated, and adds information regarding the amount and type of the packet data to the packet data.

According to a second aspect of the present invention, there is provided a communications control method for controlling packet communications between a base station and a mobile station, which method comprises the steps of: a) transmitting a preamble signal to the base station, varying the transmission power level, in advance of transmission of packet data or a reservation signal; b) transmitting information regarding the amount and type of subsequent packet data as the reservation signal to the base station, in parallel with transmission processing of the packet data; c) determining, at the base station, the transmission power level of the packet data based on the received intensity of the preamble signal or the reservation signal and the information regarding the amount and type of the packet data; and d) obtaining, at the mobile station, information regarding the determined transmission power level of the packet data and transmitting the packet data based on the obtained information.

According to a third aspect of the present invention, there is provided a mobile station for transmitting and receiving packet data to and from a base station, which comprises: a preamble signal transmitter configured to transmit a preamble signal, varying the transmission power level, in advance of transmission of packet data or a reservation signal; a reservation signal transmitter configured to transmit information, as the reservation signal, regarding the amount and type of subsequent packet data to the base station, in parallel with transmission processing of the packet data; and a packet data transmitter configured to obtain information regarding a transmission power level determined at the base station and transmit the packet data based on the obtained information.

According to a fourth aspect of the present invention, there is provided a base station for transmitting and receiving packet data to and from a mobile station, which comprises: a preamble signal receiver configured to receive a preamble signal transmitted at varied transmission power levels, in advance of reception of the packet data or a reservation signal; a reservation signal receiver configured to receive the reservation signal including information regarding the amount and type of subsequent packet data, transmitted in parallel with transmission processing of the packet data; and a determiner configured to determine the transmission power level of the packet data based on the received intensity of the preamble signal or the reservation signal and the information regarding the mount and type of the packet data.

BRIEF DESCRIPTION OF THE SEVERAL VIEWS OF THE DRAWINGS

FIG. 2 is a diagram illustrating the operation of allocating a dedicated control channel and the operation of transmitting a single packet of data in the communications control system according to the embodiment of the present invention;

DETAILED DESCRIPTION OF THE INVENTION

Configuration of a Communications Control System According to an Embodiment of the Invention A communications control system and a communications control method according to an embodiment of the present invention will be described in detail below.

Figure 1A:
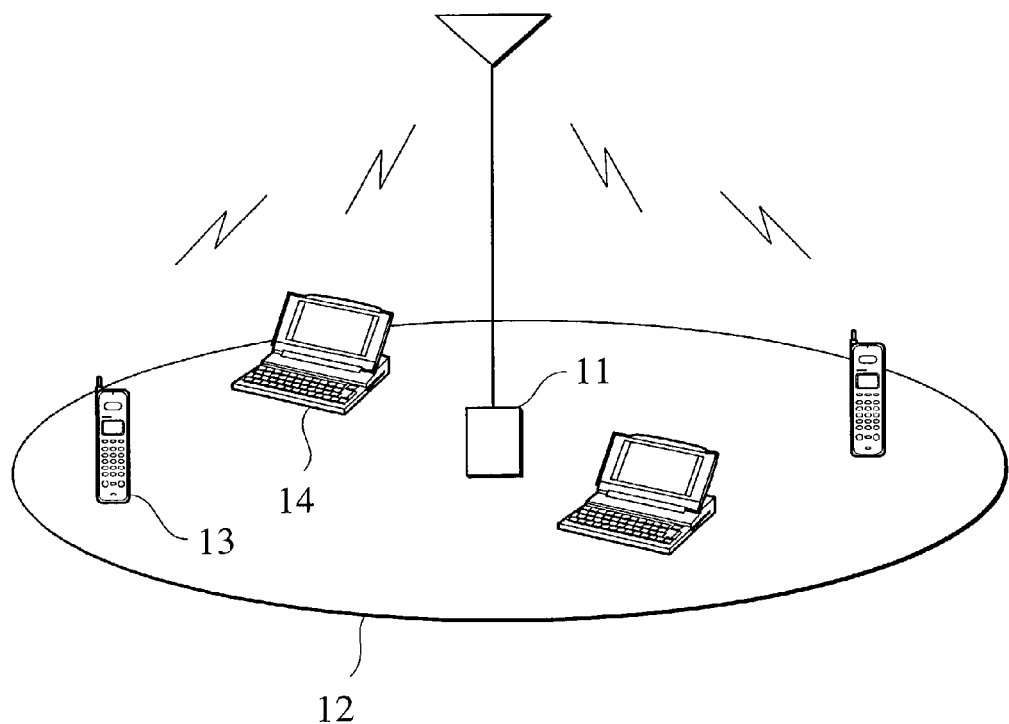
FIG. 1A is a diagram illustrating the entire configuration of a communications control system according to an embodiment of the present invention.

FIG. 1A is a diagram illustrating the entire configuration of the communications control system according to the embodiment. The embodiment will be described with a CDMA packet communications control system as an example. The system includes a plurality of terminals (mobile stations) 13 and 14 under a base station 11. Packet communications are performed between the terminals 13, 14 and the base station 11. Packet data is code-division multiplexed over a shared channel on a radio link between the terminals 13, 14 and the base station 11.

In this embodiment, as shown in FIG. 1A, packet data from the voice/video terminals 13 and the data terminals 14 in a radio zone 12 formed by the base station 11 is code-division packet-interleaved multiplexed and transmitted to the base station 11 on a shared channel in the radio zone 12 between the terminals 13 or 14 and the base station 11.

Figure 1B:
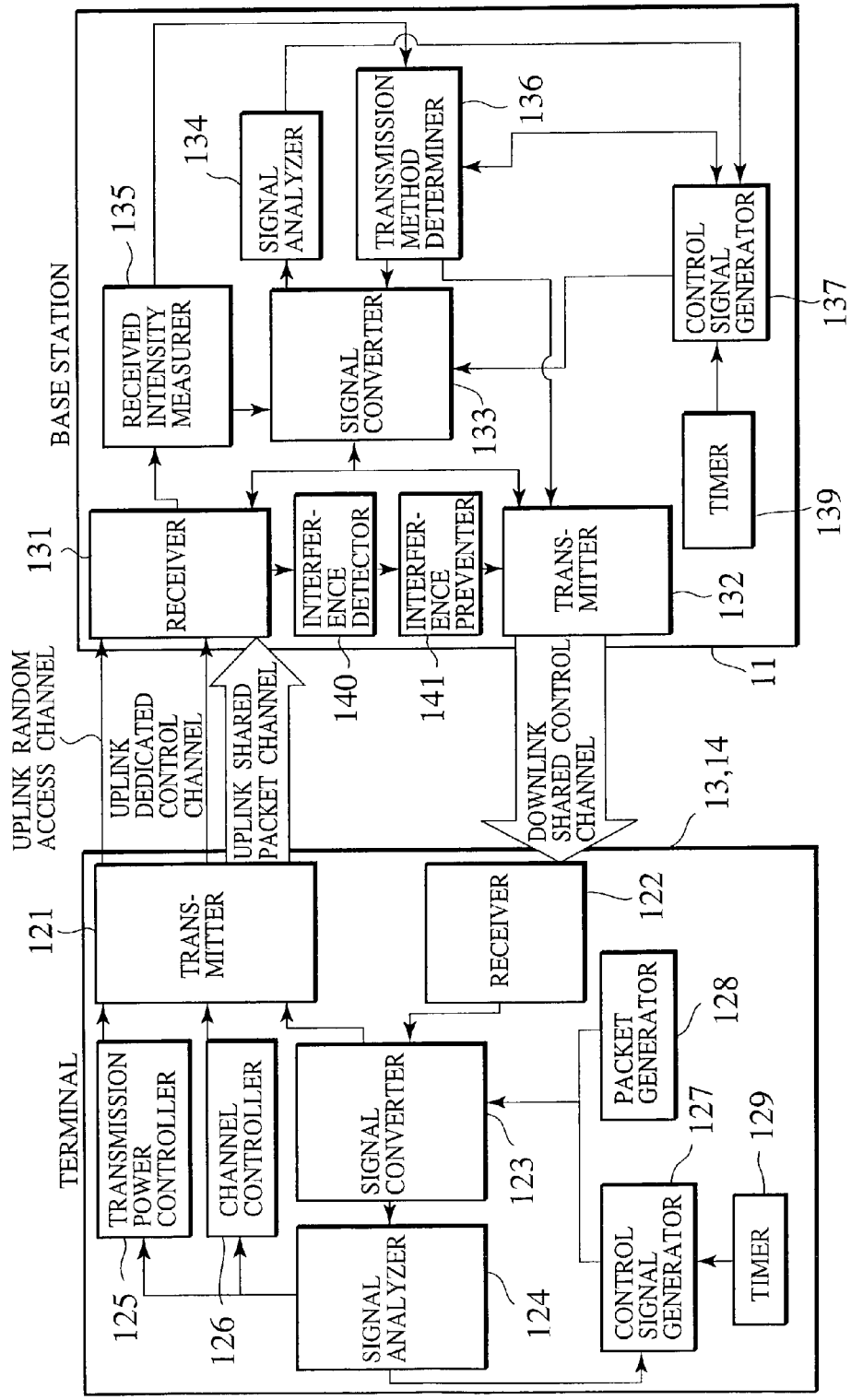
FIG. 1B is a functional block diagram of the communications control system according to the embodiment of the present invention.

The configurations of the base station 11 and the terminals 13 and 14 will be described. FIG. 1B is a block diagram illustrating the inside configurations of the base station 11 and the terminals 13 and 14 according to this embodiment.

As shown in FIG. 1B, each of the terminals 13 and 14 includes a transmitter 121, a receiver 122, a signal converter 123, a signal analyzer 124, a transmission power controller 125, a channel controller 126, a control signal generator 127, a packet generator 128 and a timer 129.

The transmitter 121 is a circuit for transmitting a signal to a receiver 131 of the base station 11 over a radio communication line (an uplink random access channel, an uplink dedicated control channel or an uplink shared packet channel).

The transmitter 121 transmits a signal converted at the signal converter 123. The transmitter 121 transmits packet data and a signal such as a preamble signal or a reservation signal over a predetermined channel at a predetermined transmission power level, according to instructions from the transmission power controller 125 and the channel controller 126.

The transmitter 121 may transmit a reservation signal as a single signal over a dedicated control channel to be described later or may transmit a reservation signal using a channel on which to transmit packet data.

The receiver 122 is a circuit for receiving a signal such as an allocation signal, a synchronizing signal or an acknowledgement signal transmitted from a transmitter 132 of the base station 11 over a radio communication line (a downlink shared control channel). The receiver 122 transmits the received signal to the signal converter 123.

The signal converter 123 is a circuit for converting a control signal such as a reservation signal or a synchronizing signal, or packet data to be transmitted and received into a predetermined signal. More specifically, the signal converter 123 performs such processes as encoding, decoding, spreading and de-spreading of control signals and packet data.

In this embodiment, the signal converter 123 has a function of converting packet data based on a transmission timing and a transmission rate included in a grant signal transmitted from the base station 11 for time-division and code-division multiplexing the packet data.

The signal analyzer 124 is a circuit for analyzing a signal converted in the signal converter 123 and transmitting the result of the analysis to the units 125, 126 and/or 127 according to the type of received signal.

The signal analyzer 124 extracts, for example, an allocation signal, a synchronizing signal, a TPC (transmission power control) command and/or an acknowledgement signal from a received signal transmitted from the base station 11 for transmission to the units 125, 126 and/or 127.

The transmission power controller 125 is a circuit for controlling transmission power for a signal to be transmitted at the transmitter 121.

More specifically, the transmission power controller 125 varies the transmission power for packet data and a control signal based on a TPC command received from the signal analyzer 124. That is, the transmission power controller 125 gets an allocation signal and an acknowledgement signal from the base station 11 via the receiver 122, signal converter 123 and signal analyzer 124 and varies the packet data transmission power at the transmitter 121 based on the signals.

The transmission power controller 125 varies the transmission power for a preamble signal before transmission of packet data for power ramping.

The channel controller 126 is a circuit for controlling which channel to use for transmitting a signal to be transmitted. The channel controller 126 has a function of allocating or deallocating a random access channel, a dedicated control channel or a shared packet channel to a signal to be transmitted, based on an allocation signal or a synchronizing signal extracted in the signal analyzer 124.

In this embodiment, the channel controller 126 establishes a dedicated control channel as a channel for transmission of a reservation signal. The dedicated control channel is exclusively allocated temporary, by use of a distinct code, a predetermined timing or both, in the radio zone 12 between the mobile station 13 or 14 and the base station 11 so as to avoid interference with other dedicated control channels.

The channel controller 126 deallocates the dedicated control channel when there are no packets transmitted and received between the terminal 13 or 14 and the base station 11 for a predetermined period. The predetermined period is determined based on the type of packet data or traffic conditions of packet data or both, according to the result of analysis by the signal analyzer 124.

The channel controller 126 may be configured to deallocate a dedicated control channel by request from the mobile station 13, 14 or the base station 11.

The control signal generator 127 is a circuit for generating various types of control signals for packet communications control.

In this embodiment, the control signal generator 127 generates a synchronizing signal or a reservation signal and transmits the generated synchronizing signal or reservation signal to the signal converter 123.

The control signal generator 127 periodically generates a synchronizing signal or a reservation signal, based on information from the timer 129 connected thereto.

The packet generator 128 is a circuit for generating packet data. The packet generator 128 has a function of dividing an amount of data of a predetermined length or more into several packets of data. The packet generator 128 transmits the generated packets of data to the signal converter 123.

In this embodiment, the transmitter 121, signal converter 123, signal analyzer 124, transmission power controller 125, channel controller 126 and control signal generator 127 constitute a preamble transmitter for transmitting a preamble signal to the base station 11 at varied transmission power levels, before transmitting packet data or a reservation signal.

The base station 11 is provided with an interference power detector 140 for detecting interference power between the base station 11 and the mobile stations 13 and 14.

The base station 11 is provided with an interference preventer 141 for inhibiting transmission of a preamble signal when interference power detected exceeds a predetermined threshold. In this case, the base station 11 can add a flag for inhibiting transmission of a preamble signal to a signal to be transmitted over a downlink shared control channel so as to inhibit transmission of a preamble signal by the transmitter 121.

The mobile stations 13 and 14 may have above-mentioned function of an interference power detector 140 and an interference preventer 141.

When a packet to be transmitted is single, the preamble transmitter in this embodiment has a function of adding the information to a preamble signal. More specifically, the transmitter 121 modulates a preamble signal in a predetermined signal pattern to inform that a packet to be transmitted is single.

In this embodiment, the transmitter 121, signal converter 123, transmission power controller 125, channel controller 126 and control signal generator 127 constitute a reservation signal transmitter for transmitting information regarding the amount and type of subsequent packet data as a reservation signal to the base station 11, in parallel with transmission processing of the packet data.

In the reservation signal transmitter, the transmitter 121 gets information regarding the transmission power level of a reservation signal from the transmission power controller 125 and transmits the reservation signal generated by the signal converter 123 and the control signal generator 127 at the transmission power level based on the information.

In the reservation signal transmitter of the mobile station 13 or 14, the transmitter 121 periodically transmits a reservation signal to the base station 11 over a dedicated control channel established in addition to a channel on which to transmit packet data, according to an instruction from the channel controller 126.

This configuration can be implemented by periodically allocating a dedicated control channel to each mobile station 13, 14 with a predetermined timing. This period can be determined based on the type of packet data transmitted from or received by the mobile station 13, 14 or traffic conditions of the packet data or both.

In the reservation signal transmitter, when a channel on which to transmit packet data and a dedicated control channel become saturated, the transmitter 121 stops transmitting a reservation signal and adds information regarding the amount and type of packet data to the packet data for transmission.

In the reservation signal transmitter, the transmitter 121 can change the method of transmission of a reservation signal, according to an instruction from the base station 11. When packet data to be transmitted is a single packet of data, the transmitter 121 can add a reservation signal (or information regarding the amount and type of packet, equivalent to the contents thereof) to packet data to be transmitted over a shared packet channel, without transmitting a reservation signal over a dedicated control channel, thus changing the method of transmission of a reservation signal.

In this embodiment, the transmitter 121, signal converter 123, signal analyzer 124, transmission power controller 125, channel controller 126 and packet generator 128 constitute a packet data transmitter for getting information regarding the determined transmission power level of packet data and transmitting the packet data based on the information.

On the other hand, the base station 11 includes the receiver 131, the transmitter 132, a signal converter 133, a signal analyzer 134, a received intensity measurer 135, a transmission method determiner 136, a control signal generator 137 and a timer 139.

The receiver 131 is a circuit for receiving signals from the terminals 13 and 14 over radio communication lines (unlink random access channels, uplink dedicated control channels and an uplink shared packet channel). The receiver 131 transmits a received signal to the signal converter 133 via the received intensity measurer 135.

The transmitter 132 is a circuit for transmitting various types of signals to the receiver 122 of the terminal 13 or 14 over a radio communication line (a downlink shared control channel). A channel on which to transmit the various types of signals and the transmission power levels of the various types of signals are determined based on the determination of the transmission method determiner 136.

The signal converter 133 is a circuit for converting signals transmitted to and received from the mobile stations 13 and 14 in a predetermined signal format. For the transmission of various types of signals, the signal converter 133 encodes and spreads transmission signals received from the control signal generator 137 to send to the transmitter 132.

Upon reception of various types of signals, the signal converter 133 decodes and de-spreads the received signals obtained through the received intensity measurer 135, and then transmits the signals to the signal analyzer 134.

The signal analyzer 134 is a circuit for analyzing various types of signals converted by the signal converter 133. The signal analyzer 134 mainly analyzes the contents of reservation signals and synchronizing signals transmitted from the terminals 13 and 14, extracts information contained in the signals and transmits the results of the analysis to the transmission method determiner 136.

The signal analyzer 134 extracts, for example, information regarding the amount and type of packet data from a reservation signal received via the signal converter 133. The signal analyzer 134 checks the resource allocating conditions of dedicated control channels, selects available slots and an available code, and transmits the results of selections to the control signal generator 137.

The received intensity measurer 135 measures the signal intensity of a preamble signal or a reservation signal received by the receiver 131 and transmits the result of measurement to the transmission method determiner 136.

The transmission method determiner 136 determines transmission power levels, transmission channels and the like for packet data and reservation signals from the terminals 13 and 14 based on the results of measurements by the received intensity measurer 135 and the results of analyses by the signal analyzer 134, and transmits the determined transmission methods to the signal converter 133 and the transmitter 132.

The transmission method determiner 136 preferably causes the mobile stations 13 and 14 to vary the transmission intensities of preamble signals until they become receivable at the base station 11, detects appropriate received intensities, and determines transmission power levels and transmission channels based on the detection results. The transmission method determiner 136 may be configured to cause the mobile stations 13 and 14 to transmit preamble signals once before transmission of packet data.

When the base station 11 could receive preamble signals or reservation signals, the transmission method determiner 136 can allocate dedicated control channels to the mobile stations 13 and 14 and determine transmission power levels on the respective dedicated control channels based on the transmission power levels of the preamble signals or reservation signals having been transmitted on the dedicated control channels immediately before.

In this embodiment, the transmission method determiner 136 constitutes a determiner for determining the transmission power level of packet data based on information regarding the amount and type of the packet data.

The transmission method determiner 136 can determine the transmission power level of a first reservation signal based on the received intensity of a preamble signal and determine the transmission power level of a subsequent reservation signal based on the received intensity of a preceding reservation signal.

The transmission method determiner 136 can cause the mobile stations 13 and 14 to change the transmission methods of reservation signals when preamble signals include information notifying that packet data to be transmitted is a single packet of data.

The control signal generator 137 generates a control signal such as an acknowledgement signal, a synchronizing signal or an allocation signal based on determination of the transmission method determiner 136 for transmission to the signal converter 133.

The control signal generator 137 can periodically generate a synchronizing signal based on control of the timer 139.

The control signal generator 147 can transmit a grant signal instructing the method of transmission of packet data to a mobile station upon receiving a reservation signal. The grant signal includes a transmission timing and a transmission rate for time-division and code-division multiplexing of packet data.

When a reservation signal is received from the mobile terminal 13 or 14 and the mobile terminal 13 or 14 has already been transmitting packet data, the grant signal preferably enables transmission of packet data associated with the reservation signal after the point of time at which the ongoing transmission of the packet data is finished.

The Operation of the Communications Control System According to the Embodiment of the Invention The operation of the above-described communications control system for controlling packet communications between the base station 11 and the mobile stations 13 and 14 will be described below.

FIG. 2 exemplifies the configurations of radio channels for use in the communications control system according to the embodiment, illustrating the operation of allocating a dedicated control channel and the operation of transmitting a single packet of data of a fixed length.

As shown in FIG. 2, uplink radio channels (from the mobile stations 13 and 14 to the base station 11) and a downlink radio channel (from the base station 11 to the mobile stations 13 and 14) are all slotted. A plurality of slots (10 slots in this embodiment) constitutes a radio frame.

As shown in FIG. 2, a downlink shared control channel 21 is defined for the downlink and a random access channel 22, a dedicated control channel 23 and a shared packet channel 24 are code-multiplexed for the uplink.

The example of FIG. 2 only shows radio channels for uplink packet data transmission, omitting radio channels for downlink packet data transmission.

For transmission of packet data 29, the mobile station 13 or 14 starts transmitting a preamble signal 25 over the random access channel 22.

At this time, the mobile station 13 or 14 starts transmitting the preamble signal 25 first at a small transmission power level. Unless receiving an acquisition indicator AI from the base station 11, the mobile station 13 or 14 uses the power ramping method to transmit the preamble signal 25 at gradually increased transmission power levels.

FIG. 2 shows that the preamble signal 25 transmitted for the third time is received by the base station 11.

Upon receiving the preamble signal 25, the base station 11 checks the resource allocating conditions of dedicated control channels in its zone, selects available slots and an available code, and notifies information regarding the allocation of the dedicated control channel 23 (e.g., transmission timing) to the mobile station 13 or 14, using an allocation signal 26.

At this time, when the transmission packet of the mobile station 13 or 14 is merely a single fixed-length packet (a single packet), the terminal 13 or 14 transmits the preamble signal 25 in a predetermined specific pattern, thereby notifying that fact to the base station 11. When receiving the preamble signal 25 in the specific pattern, the base station 11 allocates the shared packet channel 24 instead of allocating the dedicated control channel 23.

Since uplink packet data from the mobile stations 13 and 14 are time-division and code-division multiplexed on the shared packet channel 24, the base station 11, when allocating the shared packet channel 24, instructs a transmission slot timing and a transmission rate of the packet data 29 so as not to totally exceed the allowable capacity of the uplink radio channels, giving consideration to the use conditions of the radio resources.

When allocated the dedicated control channel 23, the mobile station 13 or 14 starts transmitting a synchronizing signal 27 including a pilot symbol as shown in FIG. 2 at a transmission power level determined by power ramping, or directly transmits a reservation signal (not shown) for transmission of packet data 37 to be described later.

The mobile station 13 or 14 repeatedly transmits the synchronizing signal 27 in a predetermined cycle over the dedicated control channel 23. The base station 11 also transmits a synchronizing signal 28 over the shared control channel 21.

In the synchronizing signal 28 transmitted from the base station 11, a transmission power control (TPC) command is transmitted to the terminal 13 or 14 so as to regularly appropriately control the transmission power of the terminal 13 or 14.

When packet data transmitted from the mobile station 13 or 14 is a single packet of data, the mobile station 13 or 14 directly transmits the packet data 29 on the shared packet channel 24 at a transmission power level determined by power ramping.

Figure 3:
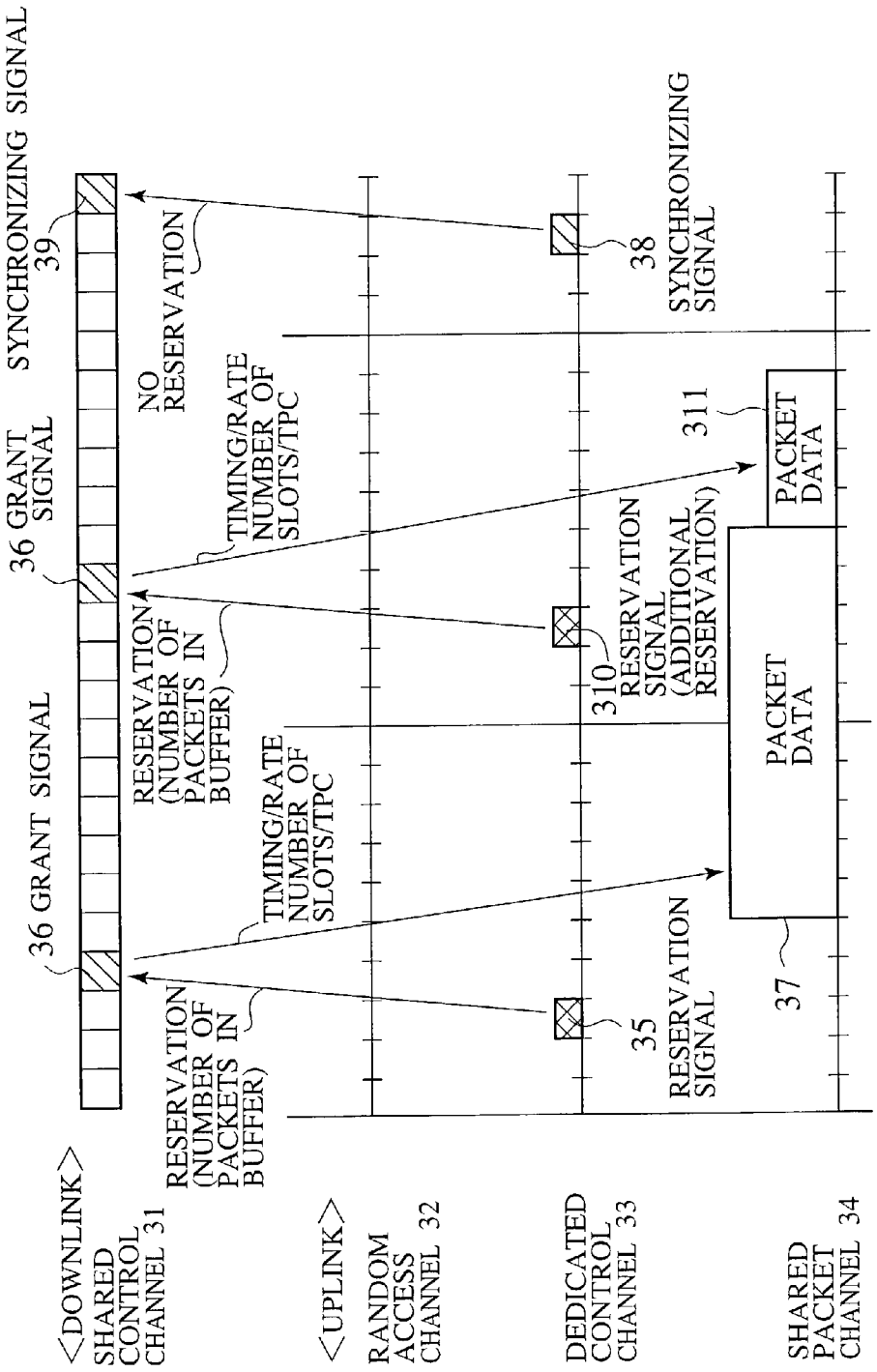
FIG. 3 is a diagram illustrating the operation of continuously transmitting packet data in the communications control system according to the embodiment of the present invention.

FIG. 3 illustrates the steps for the terminal 13 or 14 having been allocated a dedicated control channel 33 to transmit packet data 37.

For transmission of packet data, the terminal 13 or 14 transmits a reservation signal 35 including information regarding the amount (number) of packet data in its transmission buffer instead of a synchronizing signal 38 on the dedicated control channel 33.

The base station 11, when receiving the reservation signal 35, transmits a grant signal 36 specifying a transmission slot timing of the packet data, the number of slots available for transmission and a transmission rate over a shared control channel 31 so as not to totally exceed the allowable capacity of the uplink radio channels, giving consideration to the use conditions of resources of the uplink shared packet channel 34.

The grant signal 36 includes a TPC command. The mobile station 13 or 14 transmits the packet data 37 over the uplink shared packet channel 34 with the transmission timing, transmission rate and transmission power specified by the grant signal 36, using the number of slots specified by the grant signal 36.

Since the dedicated control channel 33 is periodically allocated, the mobile station 13 or 14 can transmit a reservation signal 310 during transmission of the packet data 37, and can continuously make an additional reservation for packet data 311 by the reservation signal 310 when the packet data 311 is stored in the transmission buffer.

As a result, the mobile station 13 or 14 can transmit the subsequent packet data 311 over the shared packet channel 34 immediately after the completion of transmission of the preceding packet data 37. Upon completion of transmission of all of the packet data 37 and 311, the mobile station 13 or 14 again continues transmitting the synchronizing signal 38 over the dedicated control channel 33.

As described above, the mobile station 13 or 14 is, during transmitting packet data, allocated the dedicated control channel 33. When there has been no packet data to be transmitted for a predetermined period, the allocation of the dedicated control channel 33 to the mobile station 13 or 14 is released as shown in FIG. 4.

Figure 4:
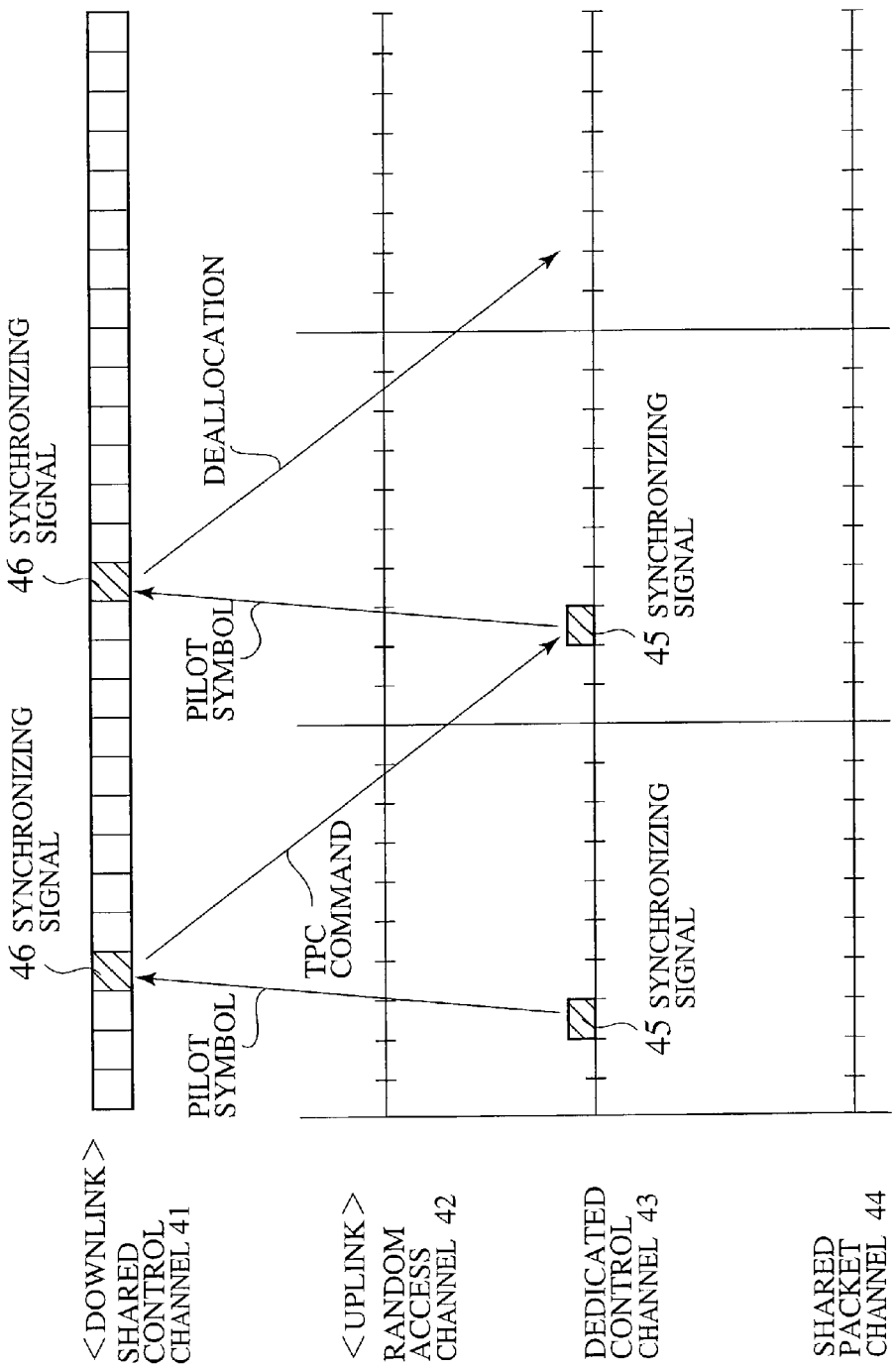
FIG. 4 is a diagram illustrating the operation of releasing allocation of a dedicated control channel in the communications control system according to the embodiment of the present invention.

In FIG. 4, the base station 11 notifies deallocation of the dedicated control channel 43 using a synchronizing signal 46 on a downlink shared control channel 41 after a lapse of a predetermined period. The mobile station 13 or 14 thereafter stops transmitting a synchronizing signal 45 on the allocated dedicated control channel 43.

FIG. 4 illustrates the steps of deallocation of the dedicated control channel 43 by the base station. The mobile station 13 or 14 can also deallocate the dedicated control channel 43, using similar steps.

Figure 5:
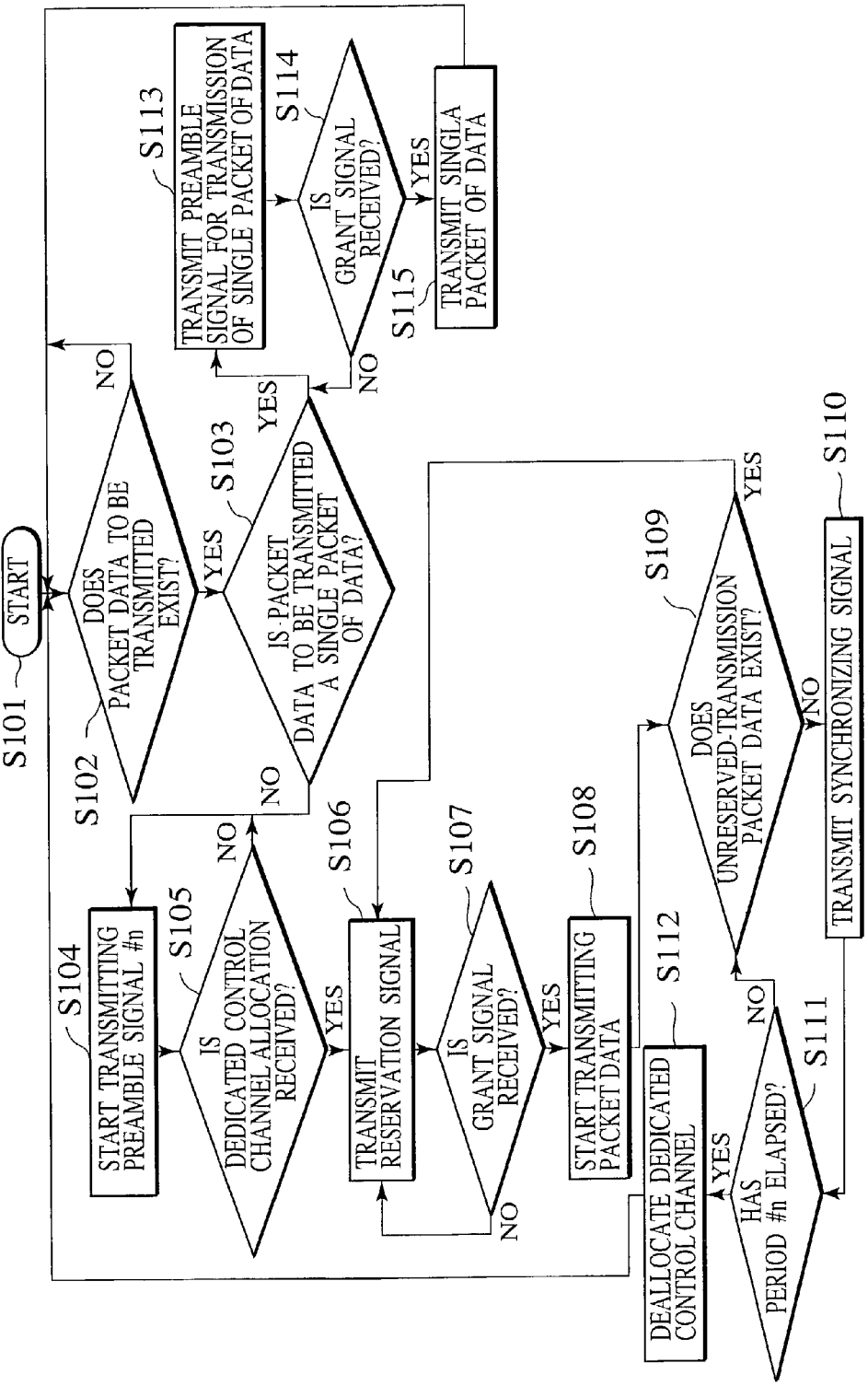
FIG. 5 is a flowchart illustrating the operation of a mobile station in the communications control system according to the embodiment of the present invention.

Now the operations of the mobile station 13, 14 and the base station 11 will be described with reference to flowcharts. FIG. 5 is a flowchart illustrating the operation of the mobile station 13 or 14.

As shown in FIG. 5, in step 101, the operation starts. In step 102, when detecting packet data to be transmitted, the mobile station 13 or 14 in a waiting state determines whether or not the packet data is a single packet of data in step 103.

When it is determined as a single packet of data, in step 113, the mobile station 13 or 14 transmits a preamble signal modulated in a predetermined pattern for transmission of the single packet of data.

In step 114, the mobile station 13 or 14 repeats transmitting the preamble signal, varying the transmission power, until receiving a grant signal from the base station 11.

Upon receiving the grant signal, in step 115, the mobile station 13 or 14 transmits the single packet of data on a shared packet channel with a timing and a transmission rate specified by the grant signal at a transmission power level determined based on the transmission power used in transmission of the preceding preamble signal.

On the other hand, in step 103, when it is determined that the packet data to be transmitted is not a single packet of data, the mobile station 13 or 14 transmits, in step 104, a preamble signal in a pattern different from that of the preamble signal used in transmission of the single packet of data.

The mobile station 13 or 14 prepares several types of patterns for a preamble signal suitable for the traffic characteristics and QoS requests of packet data to be transmitted, and previously notifies them to the base station 11 to be able to vary the cycle of a dedicated control channel and idle time till releasing. A preamble signal #n is a preamble signal having an $n^{th}$ pattern.

In step 105, the mobile station 13 or 14 transmits the preamble signal #n several times, varying the transmission power until receiving an allocation signal of a dedicated control channel.

When receiving an allocation signal from the base station 11, the mobile station 13 or 14 transmits, in step 106, a reservation signal for the packet data on a dedicated control channel specified by the allocation signal at a transmission power level determined by power ramping of the preamble signal. The allocation signal specifies a timing, a code and a cycle #n of the dedicated control channel.

Then, upon receiving a grant signal to the reservation signal in step 104, the mobile station 13 or 14 starts, in step 108, transmitting the packet data on a shared packet channel based on the transmission timing, the number of slots to use and the transmission rate specified in the grant signal and information on the transmission power based on a TCP command.

In step 109, during transmitting the packet data, the mobile station 13 or 14 determines whether or not the transmission cycle of the dedicated control channel has come and determines the presence or absence of packet data for which a reservation has not been made (unreserved-transmission packet data in the transmission buffer).

When the transmission cycle of the dedicated control channel has come and unreserved-transmission packet data exists in the transmission buffer of the mobile station 13 or 14, the mobile station 13 or 14 transmits, in step 106, a reservation signal in parallel with transmitting the packet data, and in step 107, receives a grant signal as in the above-described manner, thus being able to continuously transmit the packet data.

When it is determined that there is no unreserved-transmission packet data, the mobile station 13 or 14 assumes, in step 110, that the packet data transmission is completed and periodically transmits a synchronizing signal on the dedicated control channel.

In step 111, after transmitting the synchronizing signal, the mobile station 13 or 14 determines whether a predetermined period #n has elapsed with no existence of packet data to be transmitted. When the period n# has elapsed, the mobile station 13 or 14 deallocates the dedicated control channel in step 112.

When there is packet data to be transmitted before a lapse of the predetermined period #n, the mobile station 13 or 14 determines the presence or absence of unreserved-transmission packet data in step 109. According to the result of the determination, the mobile station 13 or 14 performs the process of steps 106 to 107 or the process of step 110.

Figure 6A:
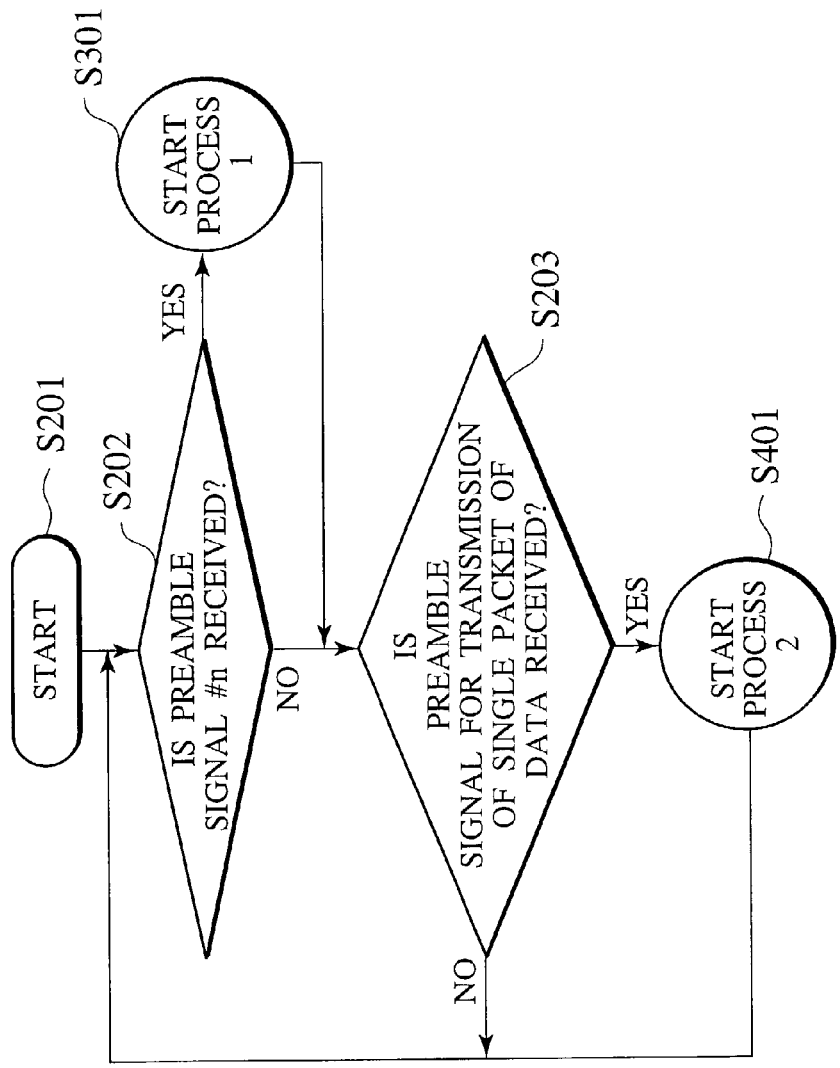
FIGS. 6A to 6C are flowcharts illustrating the operation of a base station in the communications control system according to the embodiment of the present invention.
Figure 6B:
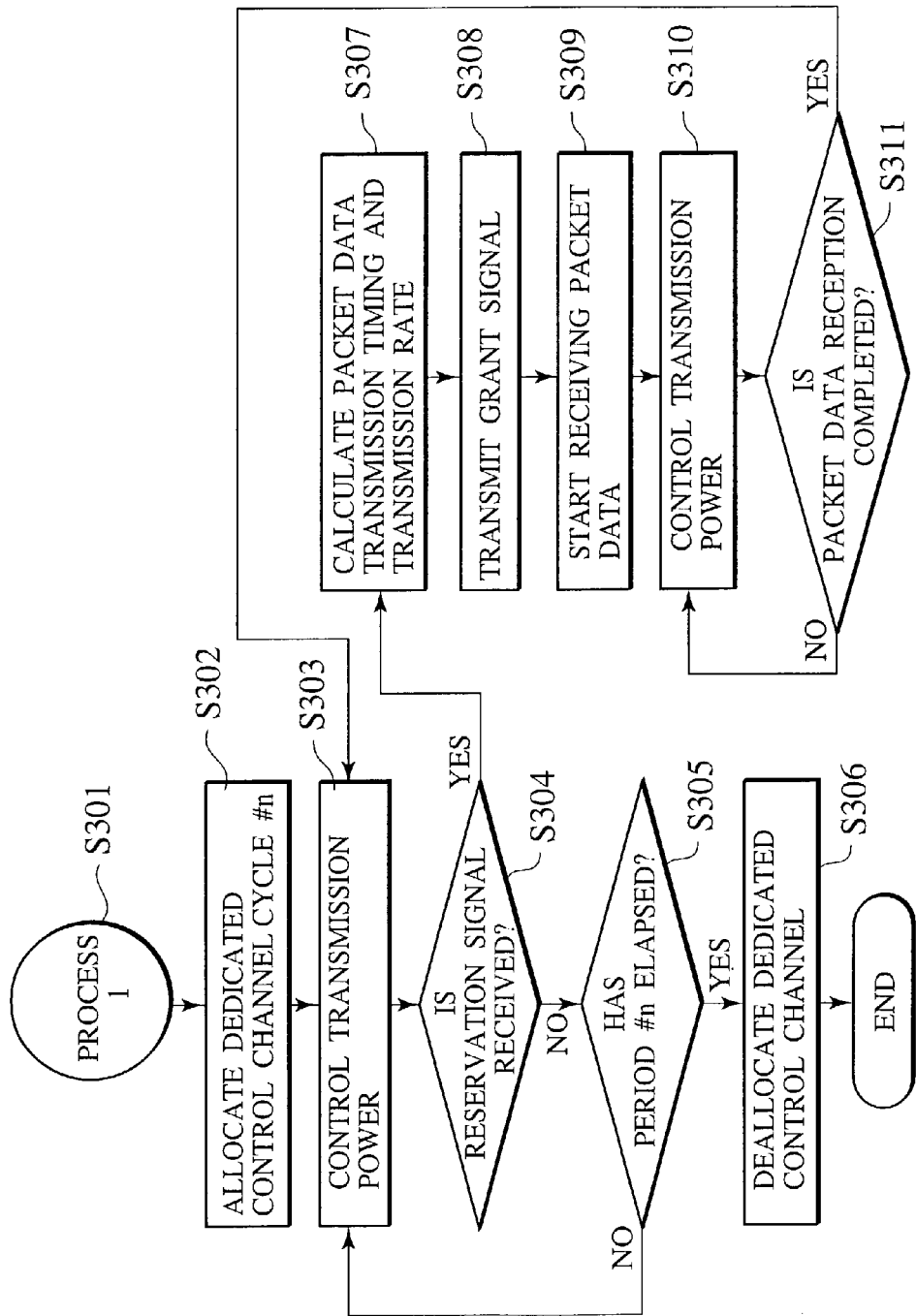
Figure 6C:
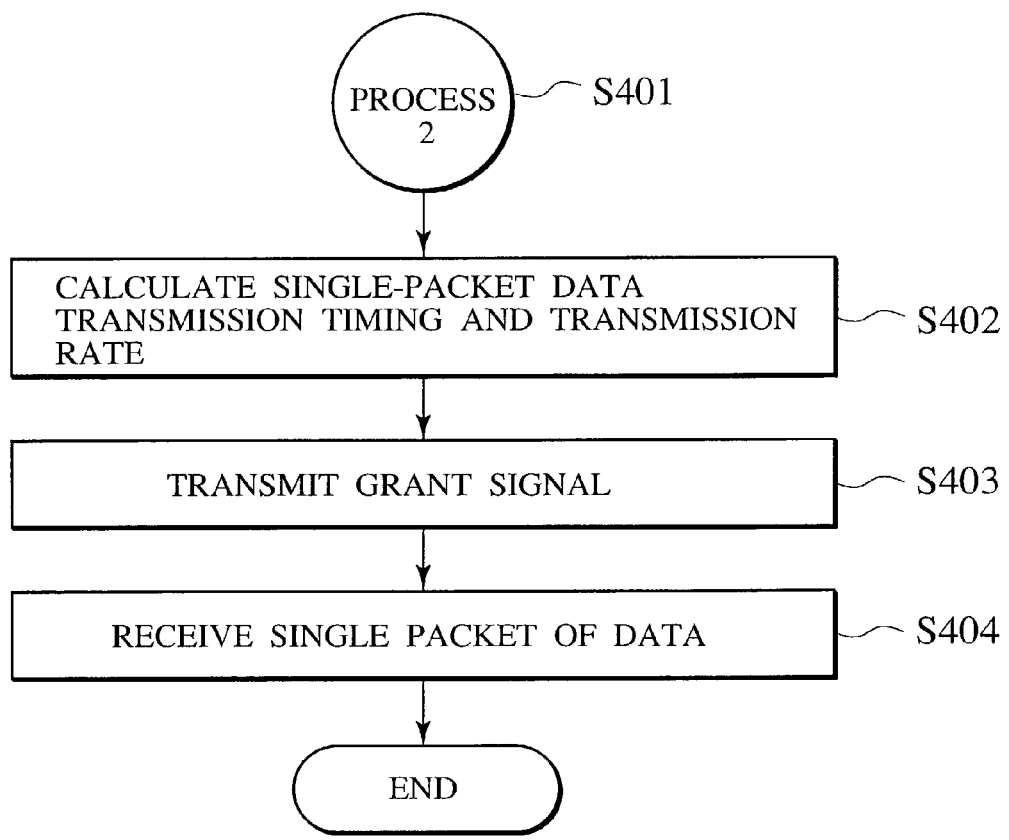

Now the operation of the base station 11 will be described. FIGS. 6A to 6C are flowcharts illustrating the operation in the base station 11.

As shown in FIG. 6A, in step 201, the operation starts. In step 202, the base station 11 waits a preamble signal over a random access channel.

Upon receiving a preamble signal #n, in step 301, the base station 11 starts "process 1," an access control process using a dedicated control channel.

When not receiving a preamble signal #n in step 202, the base station 11 determines whether or not a preamble signal for transmission of a single packet of data is received in step 203.

When receiving a preamble signal for transmission of a single packet of data, the base station 11 starts "process 2," a process for receiving a signal packet of data in step 401.

As shown in FIG. 6B, in step 302 of the process 1 (S301), the base station 11 allocates a dedicated control channel to the mobile station 13 or 14 according to the use conditions of the radio resources. At this time, the base station 11 specifies a period #n, a slot timing for starting transmission and a code.

In step 303, the base station 11 performs transmission power control for the mobile station 13 or 14 using a synchronizing signal transmitted over a downlink shared control channel, based on the received electric field intensity of the synchronizing signal periodically transmitted from the mobile station 13 or 14 on the dedicated control channel. In step 304, the base station 11 determines whether or not a reservation signal is received from the mobile station 13 or 14.

Upon receiving a reservation signal in step 304, in step 307, the base station 11 adjusts timing to prevent overlapping of transmission periods when the mobile station 13 or 14 is transmitting packet data, giving consideration to the use conditions of resources of the uplink radio channels, and calculates a packet data transmission timing, the number of transmission slots and a transmission rate so as not to exceed the allowable capacity of the uplink radio channels.

In step 308, the base station 11 transmits a grant signal including the above information to the mobile station 13 or 14.

In step 309, the base station 11 starts receiving the packet data on the shared packet channel.

In step 310, the base station 11 continuously performs the transmission power control while receiving the packet data. In step 311, the base station 11 determines whether or not the reception of the packet data is completed.

When the completion of reception of the packet data is determined in step 311, the operation returns to step 303. When it is determined that the reception of the packet data is not completed, the operation continues step 310.

In step 304, when no reception of a reservation signal is determined, it is then determined whether or not there is a new packet transmission from the terminal within a period corresponding to #n (S305). When YES, the operation returns to the transmission power control in step 303. When NO, the operation releases the allocation of the dedicated control channel to the terminal (S306).

In the process 2 (S401), the base station 11 calculates, in step 402, a transmission timing and a transmission rate for transmission of a single packet of data as in receiving a reservation signal. In step 403, the base station 11 notifies the calculated information, using the grant signal, to the mobile station 13 or 14. In step 404, the base station 11 receives the single packet of data.

The Functions and Effects of the Communications Control System According to the Embodiment of the Invention As described above, the communications control system according to the embodiment controls transmission power of packet data, which is indispensable to W-CDMA systems and the like, while making reservation accesses with reservation signals, thereby providing high channel efficiency and QoS control of packet data.

The communications control system according to the embodiment performs transmission power control using a preamble signal in advance of transmission of a reservation signal and regularly updates information regarding transmission power control by a reservation signal, allowing highly efficient access by reservation.

More specifically, a reservation signal notifies information regarding transmission power control to the base station 11 in parallel with transmission processing of packet data, eliminating the need for transmission power control by a preamble signal for transmission of subsequent packet data, reducing the overhead associated therewith, and allowing transmission of lengthy packet data while the transmission power control is being performed.

In the communications control system according to the embodiment, control channels are dedicatedly and periodically allocated to the mobile stations 13 and 14, respectively, so that reservation signals or synchronizing signals can be transmitted over the control channels to the base station 11, information regarding transmission power control can be regularly updated, and maintenance of synchronous state allows reduction in overhead associated with power ramping for transmitting subsequent packet data.

In the communications control system according to the embodiment, a reservation signal is transmitted over a dedicated control channel, so that the reservation signal is prevented from collision with other reservation signals, which results in avoidance of rapid degradation in throughput of a random access channel in high traffic.

The communications control system according to the embodiment allows the mobile stations 13 and 14 to simultaneously perform transmission of packet data and transmission of a reservation signal, providing continuous transmission of packet data by controlling the transmission timing, and thus resulting in increase in channel efficiency.

The communications control system according to the embodiment can control the use of dedicated control channels according to the traffic of radio channels, allowable delay time requested by each packet data and the like, controlling a balance between efficient use of resources of control channels and the degree of satisfaction of the QoS of packet data.

When packet data to be transmitted is not produced in a burst but in a single packet, the communication control system according to the embodiment transmits the packet data over a shared packet channel without fixedly allocating a control channel, allowing prevention of wasteful use of the radio resources.

The communications control system according to the embodiment allows the mobile stations 13 and 14 to transmit packet data while transmitting reservation signals for transmitting subsequent packet data by transmitting the reservation signals over control channels, and allows the base station 11 to control the transmission timings based on the reservation signals so as to allow the packet data of the mobile stations 13 and 14 to be sequentially transmitted, and thus being able to overlap the response delay time from the transmission of the reservation signals to the start of transmission of the packet data on the transmission time of the packet data of the mobile stations 13 and 14, which results in an increase in channel efficiency.

As described above, for transmission/reception of packet data between the base station 11 and the mobile stations 13 and 14 in a W-CDMA system or the like, the present invention allows transmission power control for each packet while reducing the overhead and control processing delay due to power ramping and reception of acquisition indicators, increasing the quality of transmission.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A communications control system for controlling packet communications between a base station and a mobile station, said system comprising:

a preamble signal transmitter configured to transmit a preamble signal to said base station, varying the transmission power level, in advance of transmission of packet data or a reservation signal;

a reservation signal transmitter configured to transmit information, as the reservation signal, regarding the amount and type of subsequent packet data to said base station, in parallel with transmission processing of said packet data;

a determiner configured to determine the transmission power level of said packet data based on the received intensity of said preamble signal for a first amount of packet data, and based on said reservation signal and said information regarding the amount and type of said packet data for a second amount of packet data; and a packet data transmitter configured to obtain information regarding said determined transmission power level of said packet data and transmit said packet data based on said obtained information.

2. A communications control system as set forth in claim 1, wherein said reservation signal transmitter periodically or continuously transmits said reservation signal from said mobile station to said base station over a control channel established in addition to a channel on which to transmit said packet data.

3. A communications control system as set forth in claim 2, wherein said control channel is exclusively allocated temporary in a radio link between said mobile station and said base station by use of a distinct code, a specific timing or both so as not to interfere with other control channels.

4. A communications control system as set forth in claim 3, wherein:

the allocation of said control channel is released when there is no packet data to be transmitted and received between said mobile station and said base station within a predetermined period; and said predetermined period is determined based on the type of said packet data, the traffic conditions of said packet data or both.

5. A communications control system as set forth in claim 1, further comprising:

a grant signal transmitter configured to transmit a grant signal instructing the method of transmission of said packet data to said mobile station, in response to said reservation signal received;

said grant signal including a transmission timing and a transmission rate for time-division and code-division multiplexing of said packet data.

6. A communications control system as set forth in claim 1, wherein:

when packet data to be transmitted is a single packet of data, said preamble signal includes a information notifying the fact; and said determiner varies the method of transmission of said packet data or said reservation signal based on said notification.

7. A communications control system as set forth in claim 1, further comprising:

an interference power detector configured to detect interference power at said base station; and an interference preventer configured to inhibit transmission of said preamble signal when said interference power detected exceeds a predetermined threshold.

8. A communications control system as set forth in claim 1, wherein said reservation signal transmitter stops transmitting said reservation signal when a channel on which to transmit said packet data and a control channel are saturated, and adds information regarding the amount and type of said packet data to said packet data.

9. A communications control system for controlling packet communications between a base station and a mobile station, said system comprising:

a preamble signal transmitter configured to transmit a preamble signal to said base station, varying the transmission power level, in advance of transmission of packet data or a reservation signal;

a reservation signal transmitter configured to transmit information, as the reservation signal, regarding the amount and type of subsequent packet data to said base station, in parallel with transmission processing of said packet data;

a determiner configured to determine the transmission power level of said packet data based on the received intensity of said preamble signal or said reservation signal and said information regarding the amount and type of said packet data; and a packet data transmitter configured to obtain information regarding said determined transmission power level of said packet data and transmit said packet data based on said obtained information, wherein:

said determiner determines the transmission power level of a first reservation signal based on the received intensity of said preamble signal, and determines the transmission power level of a subsequent reservation signal based on the received intensity of a preceding reservation signal; and said reservation signal transmitter obtains information regarding the determined transmission power level of said reservation signal and transmits said reservation signal at said transmission power level based on said obtained information.

10. A communications control method for controlling packet communications between a base station and a mobile station, said method comprising the steps of:

a) transmitting a preamble signal to said base station, varying the transmission power level, in advance of transmission of packet data or a reservation signal;

b) transmitting information regarding the amount and type of subsequent packet data as the reservation signal to said base station, in parallel with transmission processing of said packet data;

c) determining, at said base station, the transmission power level of said packet data based on the received intensity of said preamble signal for a first amount of packet data, and based on said reservation signal and said information regarding the amount and type of said packet data for a second amount of packet data; and d) obtaining, at said mobile station, information regarding said determined transmission power level of said packet data and transmitting said packet data based on said obtained information.

11. A communications control method as set forth in claim 10, wherein in said step b), said reservation signal is periodically or continuously transmitted from said mobile station to said base station over a control channel established in addition to a channel on which to transmit said packet data.

12. A communications control method as set forth in claim 11, wherein said control channel is exclusively allocated temporary in a radio link between said mobile station and said base station by use of a distinct code, a specific timing or both so as not to interfere with other control channels.

13. A communications control method as set forth in claim 12, wherein:
the allocation of said control channel is released when there is no packet data to be transmitted and received between said mobile station and said base station within a predetermined period; and
said predetermined period is determined based on the type of said packet data, the traffic conditions of said packet data, or both.

14. A communications control method as set forth in claim 10, further comprising the step of:
transmitting to said mobile station a grant signal instructing the method of transmission of said packet data in response to said reservation signal received;
said grant signal including a transmission timing and a transmission rate for time-division and code-division multiplexing of said packet data.

15. A communications control method as set forth in claim 10, wherein:
when packet data to be transmitted is a single packet of data, said preamble signal includes information notifying the fact; and
the method of transmission of said packet data or said reservation signal is varied based on said notification.

16. A communications control method as set forth in claim 10, further comprising the step of:
detecting interference power at said base station; wherein,
in said step a), when said interference power detected exceeds a predetermined threshold, transmission of said preamble signal is inhibited.

17. A communications control method as set forth in claim 10, wherein in said step b), when a channel on which to transmit said packet data and a control channel are saturated, transmission of said reservation signal is stopped, and information regarding the amount and type of said packet data is added to said packet data.

18. A communications control method for controlling packet communications between a base station and a mobile station, said method comprising the steps of:
a) transmitting a preamble signal to said base station, varying the transmission power level, in advance of transmission of packet data or a reservation signal;
b) transmitting information regarding the amount and type of subsequent packet data as the reservation signal to said base station, in parallel with transmission processing of said packet data;
c) determining, at said base station, the transmission power level of said packet data based on the received intensity of said preamble signal or said reservation signal and said information regarding the amount and type of said packet data; and d) obtaining, at said mobile station, information regarding said determined transmission power level of said packet data and transmitting said packet data based on said obtained information;
determining, at said base station, the transmission power level of a first reservation signal based on the received intensity of said preamble signal and determining the transmission power level of a subsequent reservation signal based on the received intensity of a preceding reservation signal; wherein,
in said step b), said mobile station obtains information regarding the determined transmission power level of said reservation signal and transmits said reservation signal at said transmission power level based on said obtained information.

19. A mobile station for transmitting and receiving packet data to and from a base station, comprising:
a preamble signal transmitter configured to transmit a preamble signal, varying the transmission power level, in advance of transmission of packet data or a reservation signal;
a reservation signal transmitter configured to transmit information, as the reservation signal, regarding the amount and type of subsequent packet data to said base station, in parallel with transmission processing of said packet data; and
a packet data transmitter configured to obtain information regarding the transmission power level thereof determined at said base station based on a received intensity of the preamble signal for a first amount of packet data, and based on the reservation signal for a second amount of packet data, and transmit said packet data based on said obtained information.

20. A mobile station as set forth in claim 19, wherein said reservation signal transmitter periodically or continuously transmits said reservation signal to said base station over a control channel established in addition to a channel on which to transmit said packet data.

21. A mobile station as set forth in claim 20, wherein said control channel is exclusively allocated temporary in a radio link by use of a distinct code, a specific timing or both so as not to interfere with other control channels.

22. A mobile station as set forth in claim 21, wherein the allocation of said control channel is released when there is no packet data to be transmitted and received between said mobile station and said base station within a predetermined period; and said predetermined period is determined based on the type of said packet data, the traffic conditions of said packet data or both.

23. A mobile station as set forth in claim 19, further comprising:
a grant signal receiver configured to receive from said base station a grant signal instructing the method of transmission of said packet data in response to said reservation signal received;
said grant signal including a transmission timing and a transmission rate for time-division and code-division multiplexing of said packet data.

24. A mobile station as set forth in claim 19, wherein when packet data to be transmitted is a single packet of data, information notifying the fact is added to said preamble signal.

25. A mobile station as set forth in claim 19, wherein said reservation signal transmitter stops transmitting said reservation signal when a channel on which said packet data is transmitted and a control channel are saturated, and adds information regarding the amount and type of said packet data to said packet data.

26. A mobile station for transmitting and receiving packet data to and from a base station, comprising:
- a preamble signal transmitter configured to transmit a preamble signal, varying the transmission power level, in advance of transmission of packet data or a reservation signal;
- a reservation signal transmitter configured to transmit information, as the reservation signal, regarding the amount and type of subsequent packet data to said base station, in parallel with transmission processing of said packet data; and
- a packet data transmitter configured to obtain information regarding the transmission power level thereof determined at said base station and transmit said packet data based on said obtained information;
- said base station determines the transmission power level of a first reservation signal based on the received intensity of said preamble signal, and determines the transmission power level of a subsequent reservation signal based on the received intensity of a preceding reservation signal; and
- said reservation signal transmitter obtains information regarding the determined transmission power level of said reservation signal and transmits said reservation signal at said transmission power level based on said obtained information.

27. A base station for transmitting and receiving packet data to and from a mobile station, comprising:
- a preamble signal receiver configured to receive a preamble signal transmitted at varied transmission power levels, in advance of reception of said packet data or a reservation signal;
- a reservation signal receiver configured to receive the reservation signal including information regarding the amount and type of subsequent packet data, transmitted in parallel with transmission processing of said packet data; and
- a determiner configured to determine the transmission power level of said packet data based on the received intensity of said preamble signal for a first amount of packet data, and based on said reservation signal and said information regarding the amount and type of said packet data for a second amount of packet data.

28. A base station as set forth in claim 27, wherein said determiner determines the transmission power level of a first reservation signal based on the received intensity of said preamble signal, and determines the transmission power level of a subsequent reservation signal based on the received intensity of a preceding reservation signal.

29. A base station as set forth in claim 27, wherein said reservation signal is periodically or continuously transmitted from said mobile station over a control channel established in addition to a channel on which to transmit said packet data.

30. A base station as set forth in claim 29, wherein said control channel is exclusively allocated temporary in a radio link between said mobile station and said base station by use of a distinct code, a specific timing or both so as not to interfere with other control channels.

31. A base station as set forth in claim 30, wherein the allocation of said control channel is released when there is no packet data to be transmitted and received between said mobile station and said base station within a predetermined period; and said predetermined period is determined based on the type of said packet data, the traffic conditions of said packet data or both.

32. A base station as set forth in claim 27, further comprising:
- a grant signal transmitter configured to transmit to said mobile station a grant signal instructing the method of transmission of said packet data in response to said reservation signal received;
- said grant signal including a transmission timing and a transmission rate for time-division and code-division multiplexing of said packet data.

33. A base station as set forth in claim 27, wherein:
when packet data to be transmitted is a single packet of data, said preamble signal includes information notifying the fact; and
said determiner varies the method of transmission of said packet data or said reservation signal based on said notification.

34. A base station as set forth in claim 27, further comprising:
- an interference power detector configured to detect interference power at said base station; and
- an interference preventer configured to inhibit transmission of said preamble signal when said interference power detected exceeds a predetermined threshold.

* * * * *